United States Patent Office 2,797,631
Patented July 2, 1957

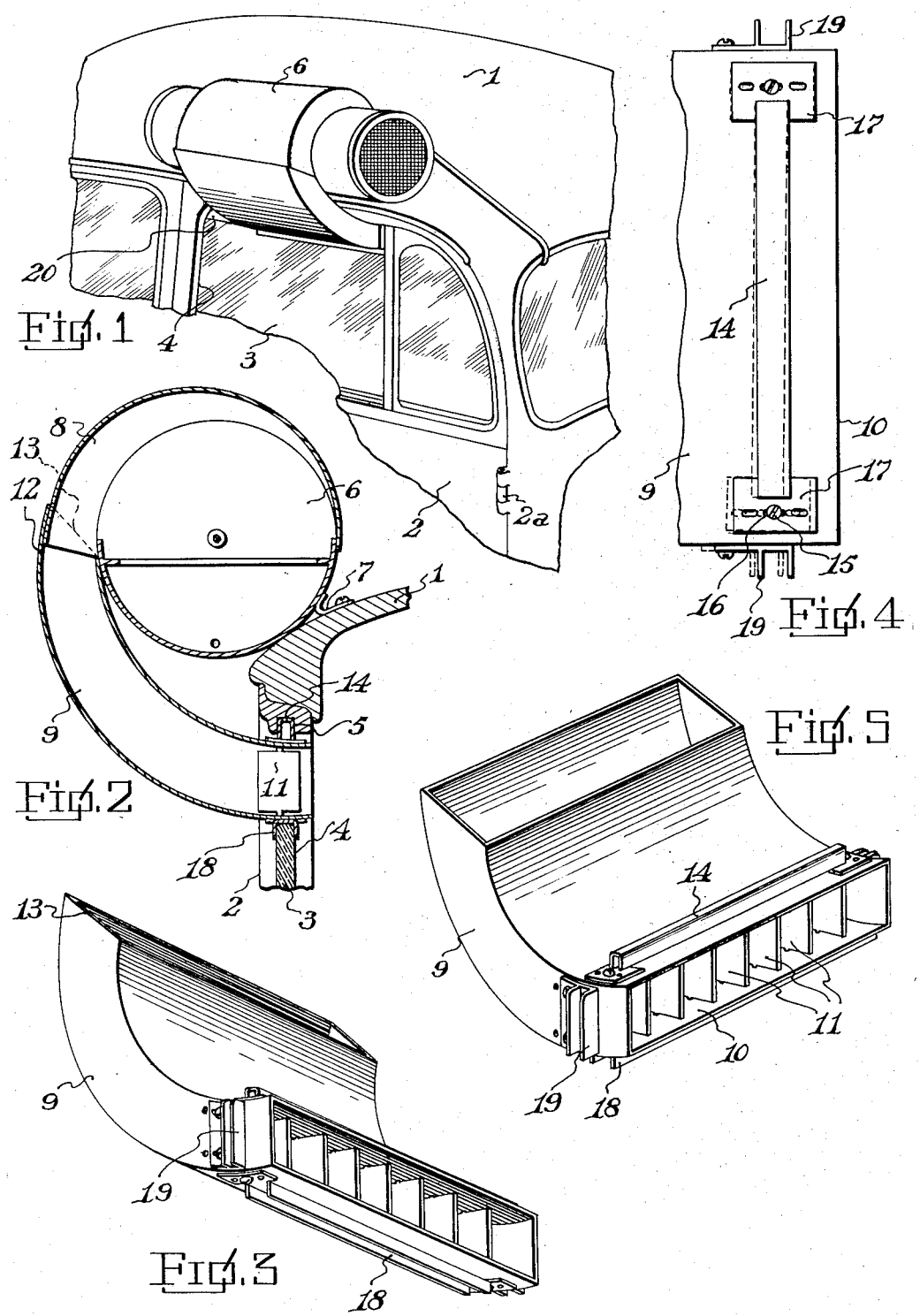

2,797,631

VEHICLE AIR CONDITIONER

Floyd L. Davis, Tulsa, Okla.

Application June 28, 1954, Serial No. 439,547

4 Claims. (Cl. 98—2)

The invention relates to vehicle air conditioners and coolers mounted on automobiles, preferably on the outside thereof and above the door, or window of the vehicle, and has for its object to provide an air duct, formed from a plurality of parts, separately connected, one in fixed relation to the conditioner and the other part mounted in the window opening. The separable structure allowing the vehicle door to be opened and closed, taking the weight of the device off the door of the vehicle and removing the massive structure of an air conditioner from a position where it interferes with the view of the operator of the vehicle.

A further object is to provide an outside air conditioner for an automobile which is not mounted in the window opening of the door of the vehicle and one wherein the conditioned air is discharged into the vehicle through a separable duct discharging through the window opening.

A further object is to provide the lower inner end of the air duct with adjustable strips for mounting said end in the window opening of the door so that it will be possible to conform the mounting to variations in structure of various window openings.

A further object is to mount the conditioner on the vehicle body above the door thereof, and to curve the discharge duct downwardly, and inwardly, and mount the lower inner end of the duct in the window opening.

With the above and other objects in view the invention resides in the combination and arrangement of parts, as hereinafter set forth described and claimed, it being understood that changes in the precise embodiment of the invention may be made within the scope of the claims without departing from the spirit of the invention.

In the drawing:

Figure 1 is a perspective view of the conditioner, showing the same applied to a conventional form of automobile.

Figure 2 is a transverse sectional view through the conditioner and the side of an automobile, showing the duct mounting.

Figure 3 is a perspective view of the lower inner air discharge end of the duct.

Figure 4 is a top plan view of the lower end of the duct, showing the adjustable window opening engaging members.

Figure 5 is a perspective view of the lower portion of the duct, showing the upper side of the lower end of the duct.

Referring to the drawing the numeral 1, designates the top of a conventional form of automobile and 2 a door carried by one side of the automobile. The door 2, is hingedly mounted at 2a on the vehicle body in a manner whereby it can swing in a horizontal plane to open or closed positions in the usual manner. Door 2 is provided with a conventional vertically slidably mounted glass window 3, which slides in the window grooves 4 of the window opening 5 in the usual way. Heretofore air conditions have been mounted in the window opening of the door of automobiles, however, this method of mounting has placed a good deal of weight and strain on the door and has formed an obstruction preventing, or interfering with the view of the operator of the automobile. To overcome this objection, the air conditioner 6 is secured to the top of the vehicle body 1 by brackets 7, which are fixed to the top of the vehicle body by suitable fasteners and which are suitably fixed to the air conditioner casing, so as to support the casing in a longitudinal position above the hinged door. The air conditioner 6 may be of any conventional form or of the kind disclosed in my pending application Serial Number 362,257, filed June 17, 1953, now Patent Number 2,767,638. Applicant does not limit himself to the precise structure of the conditioner, however, it is preferably elongated and cylindrical in shape as shown in the drawing.

The invention resides primarily in the means for conducting the conditioned air from the conditioner to the interior of the vehicle and preferably through the door window opening.

The air conditioner is provided with an arcuate transverse air discharge duct 8 through which duct conditioned air is discharged outwardly, and downwardly as shown in Figure 2. It will be noted that duct 8 terminates adjacent to the center of the air conditioner and above the upper end of the door. Supported in the window opening is an extension duct 9, which preferably increases in transverse area as it approaches its discharge end in the door opening, said discharge end being designated by the numeral 10. Mounted for pivotal movement in the discharge end 10 is a plurality of deflecting members 11, which may be adjusted to direct the conditioned air to the interior of the vehicle body. The discharge end of the extension duct is rigidly mounted in the window opening of the door and is moved out of registry with the stationary duct member 8, when the vehicle door is opened, and into registry therewith when the door is closed. The upper end 12 of the duct member 9 is beveled as shown at 13 so that the lower end of the stationary duct member 8, carried by the air conditioner is received therein, when the vehicle door is closed.

The upper side of the duct end 10 is provided with a transverse elongated member 14, which is received in the portion of the window channel 5 extending across the upper side of the window opening 2. Member 14 has its ends adjustably connected to the duct end 10 by screws 15, extending through elongated slots 16 in the flanges 17 carried by the ends of the elongated member 14. By this construction and adjustment it will be seen that misalignment may be corrected so that the interengagement of the duct ends may be accurately taken care of. The under side of the duct end 10 is supported on the upper edge of the slidable glass window as shown in Figures 1 and 2. Secured to the under side of the duct end 10 is a transverse channel member 18 in which the upper end of the glass window is received. Channel member 18 is secured to the duct end in the same manner as the member 14, so that it can be adjusted for the proper interengagement of the ends of the ducts as shown in Figure 2.

Adjustably secured to the opposite sides of the duct end 10 are channel members 19, which are received in the side channels 5 of the door window opening 2, and by being adjustable can be adjusted for the proper interengagement of the duct ends as set forth above. By forming the channels 19 with their flanges outwardly disposed they may be utilized for the reception of transparent inserts 20 when it is desired to completely close the window opening above the sliding glass window.

From the above it will be seen that an air conditioner mounting is provided for an automobile, wherein the weight and bulk of the conditioner is placed on the vehicle body, and the conditioned air discharged into the vehicle body, through the window opening and through a separable duct part, which is carried by the vehicle door and movable therewith and the other part carried by the air conditioner mounted on the outside of the vehicle body.

The invention having been set forth, what is claimed as new and useful is:

1. In combination with a vehicle body including a top, a hinged door below the top, said door having a window opening which is closed off by a window sliding in channels in the opening; an air conditioner comprising an elongated cylindrical casing, means fixing the casing longitudinally to the top of the body above the door, said casing having an open forward air inlet end and having an outer side formed with an air outlet, an arcuate duct having an inner air outlet end disposed in communication with the interior of the body through the window opening, said end of the duct having adjustable mounting means positioned in the window-opening and in the channels and engaged by the window to mount the duct in the window opening, said duct having an outer end formed with an inner and outer side wall and opposing end walls, said outer end lying on the outside of the casing and the outer side wall and end walls snugly and air-tightly overlapping the ends and outer side of the casing outlet with the inner side wall of the outer end snugly and air-tightly engaging the inner side of the casing outlet so that an air tight joint is provided.

2. An air conditioner as claimed in claim 1, wherein said adjustable means includes channels, and means mounting said channels on the side and end walls of the duct and extending laterally therefrom.

3. An air conditioner as claimed in claim 2, wherein said last means includes flanges on the channels superimposed on the walls and having elongated slots and fasteners secured to the walls and extending through the slots.

4. An air conditioner as claimed in claim 1, wherein said air outlet faces downwardly and is disposed at an acute angle with a radius of the cylindrical casing passing through the outlet.

References Cited in the file of this patent

UNITED STATES PATENTS

| | | |
|---|---|---|
| 2,435,798 | Rice et al. | Feb. 10, 1948 |
| 2,625,425 | Foster | Jan. 13, 1953 |
| 2,700,927 | Jordan | Feb. 1, 1955 |